United States Patent
Wu (10) Patent No.: US 11,602,027 B2
(45) Date of Patent: Mar. 7, 2023

(54) LIGHT SOURCE DRIVING MODULE AND METHOD

(71) Applicant: Qisda Corporation, Taoyuan (TW)

(72) Inventor: Chih-Hsiang Wu, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/536,157

(22) Filed: Nov. 29, 2021

(65) Prior Publication Data
US 2022/0312559 A1 Sep. 29, 2022

(30) Foreign Application Priority Data
Mar. 26, 2021 (CN) .......................... 202110327277.5

(51) Int. Cl.
*H05B 45/30* (2020.01)
*H05B 45/305* (2020.01)
*H05B 45/325* (2020.01)

(52) U.S. Cl.
CPC .......... *H05B 45/305* (2020.01); *H05B 45/325* (2020.01)

(58) Field of Classification Search
CPC .... H05B 45/10; H05B 45/30; H05B 445/305; H05B 45/325; H05B 45/37; H05B 47/10; H05B 47/105
See application file for complete search history.

(56) References Cited

U.S. PATENT DOCUMENTS

| 9,717,123 | B1* | 7/2017 | Yao | H05B 45/10 |
| 2015/0054423 | A1* | 2/2015 | Tyson | H05B 47/19 |
| | | | | 315/291 |
| 2019/0159310 | A1* | 5/2019 | Yang | H02M 3/157 |
| 2021/0368603 | A1* | 11/2021 | Takahashi | H05B 45/3575 |

* cited by examiner

*Primary Examiner* — Thai Pham (57) ABSTRACT

A light source driving method is applied to a light source driving module electrically connected to a light source and a controller. The light source driving module includes a frequency setting module, a driving circuit, and a conversion module. The frequency setting module generates a frequency setting signal according to a switching signal. The driving circuit generates a light source driving signal after receiving the switching signal and a current control signal. The conversion module selectively generates a driving current flowing through the light source in response to the light source driving signal. The driving current increases continuously during a rising duration, and the light source driving signal has a first operating frequency during the rising period. The driving current remains unchanged during a stable duration, and the light source driving signal has a second operating frequency during the stable period.

20 Claims, 6 Drawing Sheets

LIGHT SOURCE DRIVING MODULE AND METHOD

This application claims the benefit of People's Republic of China application Serial No. 202110327277.5, filed Mar. 26, 2021, the subject matter of which is incorporated herein by reference.

BACKGROUND OF THE INVENTION

Field of the Invention

The disclosure relates in general to a light source driving module and a light source driving method, and more particularly to a light source driving module and a light source driving method which adjust an operating frequency of a light source driving signal.

Description of the Related Art

Light source devices (for example, LED lamps, LED projectors) are basic necessities of life. With the development of optical control techniques, the light source devices own more and more designs and functions. In the present disclosure, a light source device could include one or more light sources with brightness adjustment and color tone control functions.

Figure 1:
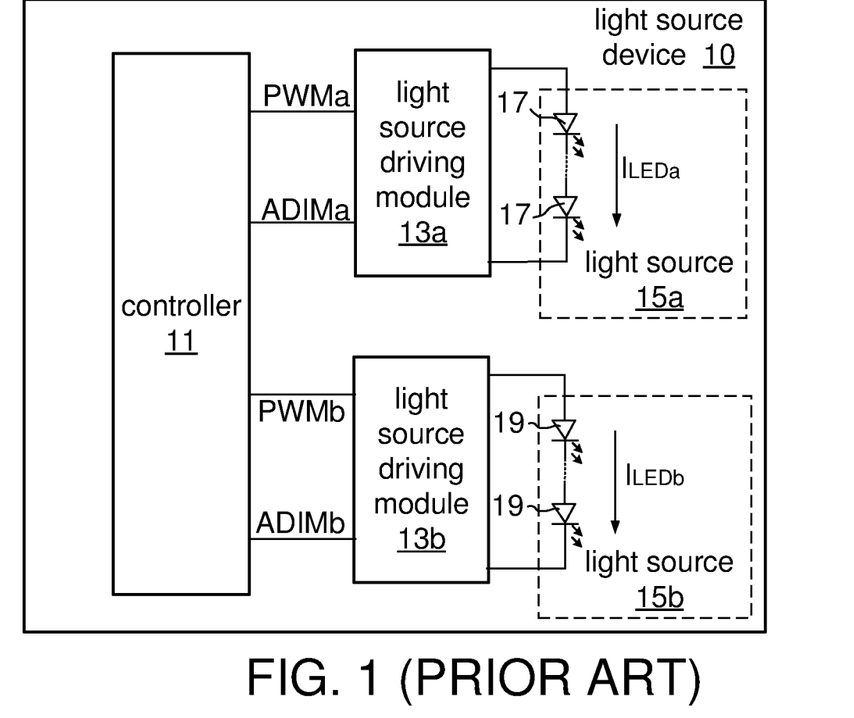
FIG. 1 (prior art) is a schematic diagram illustrating a light source device.

Please refer to FIG. 1, which is a schematic diagram of a light source device. In this diagram, the light source device 10 includes a controller 11, light source driving modules 13a, 13b, and light sources 15a, 15b. The controller 11 is electrically connected to the light source driving modules 13a, 13b. The light source driving module 13a is electrically connected to the light source 15a. The light source driving module 13b is electrically connected to the light source 15b. The light source driving module 13a is associated with the light source 15a, and the light source driving module 13b is associated with the light source 15b. Further, the light source 15a includes light-emitting diodes (LEDs) 17 connected in series, and the light source 15b includes light-emitting diodes (LEDs) 19 connected in series, too.

After receiving a switching signal PWMa and a current control signal ADIMa from the controller 11, the light source driving module 13a generates a driving current $I_{LEDa}$ to drive the light-emitting diodes 17 of the light source 15a to emit light. Basically, the controller 11 uses the switching signal PWMa to control the light source driving module 13a and uses the current control signal ADIMa to adjust the magnitude of the driving current $I_{LEDa}$. In other words, the controller 11 can control the current control signal ADIMa and the switching signal PWMa to make the light source driving module 13a adjust the brightness and color of the light source 15a by adjusting the magnitude and conducting duration of the driving current $I_{LEDa}$.

Similarly, the controller 11 transmits a switching signal PWMb and a current control signal ADIMb to the light source driving module 13b to make the light source driving module 13b adjust the brightness and color of the light source 15b by adjusting the magnitude and conducting duration of the driving current $I_{LEDb}$. The controller 11 controls the light source driving modules 13a and 13b in an independent manner. The following example explains the operation of one light source driving module coupled to one light source.

Figure 2:
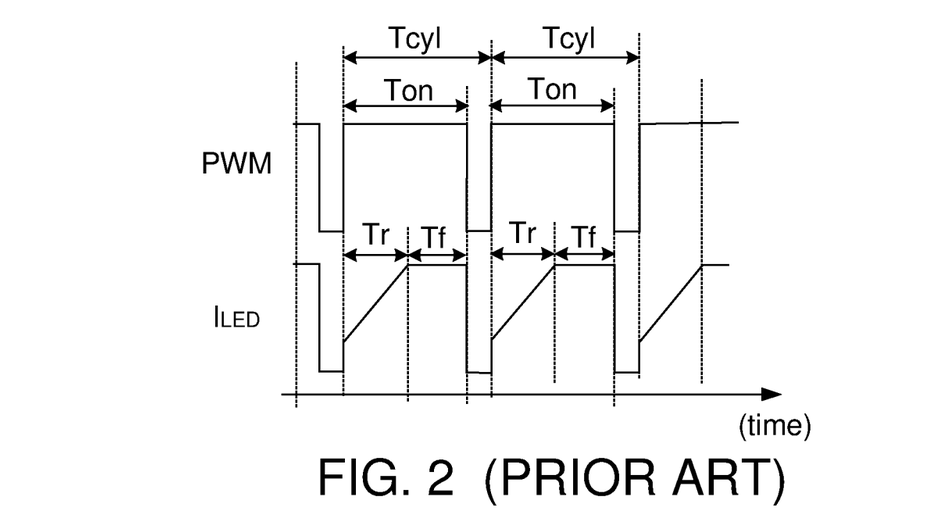
FIG. 2 (prior art) is a waveform diagram of a switching signal PWM and a driving current $I_{LED}$.

Please refer to FIG. 2, which is a waveform diagram of the switching signal PWM and the driving current $I_{LED}$. The x-axis represents time, and the y-axis represents levels of the switching signal PWM and the driving current $I_{LED}$. The switching signal PWM In FIG. 2 may be viewed as any one of the switching signals PWMa, PWMb in FIG. 1, and the driving current $I_{LED}$ may be viewed as any one of the driving currents $I_{LEDa}$, $I_{LEDb}$. The switching signal PWM is a square wave with cycles Tcyl. The switching signal PWM is at a high level during the period Ton.

When the switching signal PWM is at the high level, the light source driving module generates the driving current $I_{LED}$ flowing through the light source. According to the behavior of the driving current $I_{LED}$, the period Ton has two periods. One is the rising period Tr in which the current value of the driving current $I_{LED}$ gradually and continuously increases, and the other one is the stable period Tf in which the current value of the driving current $I_{LED}$ is fixed. There is a positive relationship between the brightness of the light source and the current value of the driving current $I_{LED}$ (for example, direct proportionality). Therefore, the light source changes from dark to bright as the rising period Tr lasts, and the light source remains its greatest brightness during the stable period Tf.

Taking a LED projector as an example, the brightness of the light source gradually increases during the rising period Tr. Therefore, the light source device 10 should shield the light source during the rising period Tr to prevent the viewer form seeing the changed brightness on the project screen. However, shielding the light source during the rising period Tr might affect the visual effect. Therefore, longer rising period Tr brings worse visual effect on the brightness of the light source.

As described above, long rising period Tr causes adverse effects on the brightness of the light source. It is an important issue to shorten the rising period Tr to make the light source device 10 to emit light with much stable brightness.

SUMMARY OF THE INVENTION

The disclosure is directed to a light source driving module and a light source driving method that consider both brightness stability and cost reduction by dynamically adjusting the operating frequency of the light source driving signal.

According to a first aspect of the present disclosure, a light source driving module electrically connected to a light source is provided. The light source driving module includes a frequency setting module, a driving circuit, and a conversion module. The frequency setting module generates a frequency setting signal according to a switching signal. The driving circuit, electrically connected to the frequency setting module, generates a light source driving signal after receiving the switching signal and a current control signal. The conversion module, electrically connected to the driving circuit and the light source, selectively generates a driving current flowing through the light source in response to the light source driving signal. The driving current increases continuously during a rising period, and the light source driving signal has a first operating frequency during the rising period. The driving current remains unchanged during a stable period, and the light source driving signal has a second operating frequency during the stable period.

According to a second aspect of the present disclosure, a light source driving method is provided. The light source driving method is used with a light source driving module electrically connected to a light source and a controller. The light source driving method includes the following steps. A switching signal and a current control signal are received from the controller. A frequency setting signal is generated according to the switching signal. A light source driving signal is generated according to the switching signal and the current control signal. A driving current is selectively generated and flows through the light source in response to the light source driving signal. The driving current increases continuously during a rising period, and the light source driving signal has a first operating frequency during the rising period. The driving current remains unchanged during a stable period, and the light source driving signal has a second operating frequency during the stable period.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms shown in the present disclosure use the typical vocabulary in the field. The interpretation of other terms is based on the definition or description given in the specification. Every embodiment of the present disclosure may involve one or more features, and these features could be applied to the device and method individually or collectively in any combination as required.

To consider both brightness stability and cost reduction, the present disclosure provides embodiments of the light source driving module and the light source driving method which dynamically adjusts the operating frequency of the light source driving signal. Only one light source driving module and one light source are described in this embodiment, but the number of the light source driving module and the light source is not limited to this condition.

Figure 3:
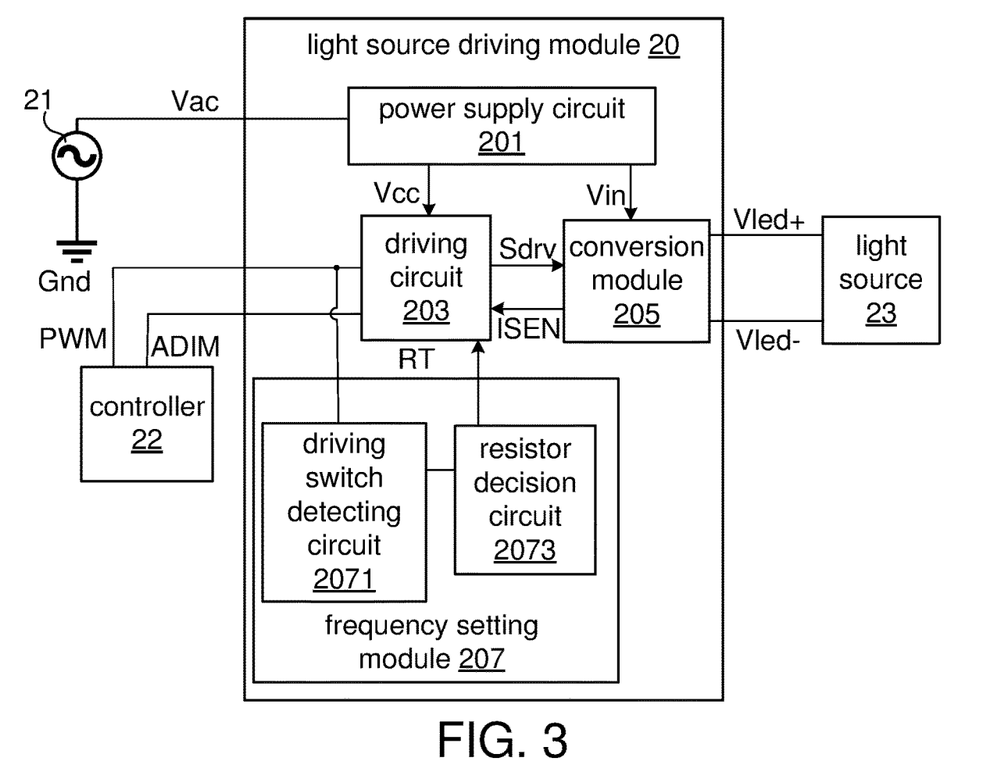
FIG. 3 is a block diagram illustrating a light source driving module according to an embodiment of the present disclosure.

Please refer to FIG. 3, which is a block diagram illustrating a light source driving module according to an embodiment of the present disclosure. The light source driving module 20 is electrically connected to an AC power source 21, a controller 22, and a light source 23. The light source driving module 20 includes a power supply circuit 201, a driving circuit 203, a conversion module 205, and a frequency setting module 207. The frequency setting module 207 further includes a driving switch detecting circuit 2071 and a resistor decision circuit 2073 electrically connected to each other.

The power supply circuit 201 is electrically connected to the AC power source 21, the driving circuit 203, and the light source 23. The power supply circuit 201 converts the AC voltage provided by the AC power source 21 into the DC voltage (operating voltage Vcc and input voltage Vin). Then, the operating voltage Vcc is transmitted to the driving circuit 203, and the input voltage Vin is transmitted to the conversion module 205.

The driving circuit 203 is electrically connected to the conversion module 205 and the resistor decision circuit 2073. The conversion module 205 is electrically connected to the light source 23. Further, the driving circuit 203 receives a switching signal PWM and a current control signal ADIM from the controller 22. The driving switch detecting circuit 2071 receives the switching signal PWM from the controller 22. After generating a light source driving signal Sdrv, the driving circuit 203 transmits the light source driving signal Sdrv to the conversion module 205.

Then, the conversion module 205 provides light source driving voltages Vled+ and Vled− to respective terminals of the light source 23 according to the light source driving signal Sdrv. A ratio of voltage drop ΔV between the light source driving voltages Vled+ and Vled− to the input voltage Vin should be less than a predetermined ratio threshold Pth, that is, ΔV/Vin<Pth. The predetermined ratio threshold Pth is determined based on the requirements of the applications, for example, Pth=95%. The conversion module 205 generates and transmits a current feedback signal ISEN to the driving circuit 203 according to the status of the light source 23. The driving circuit 203 uses the current feedback signal ISEN to adjust the light source driving signal Sdrv.

The rising period Tr depends on the operating frequency Fdrv of the light source driving signal Sdrv. When the operating frequency Fdrv increases, the rising period Tr has a shorter duration. On the contrary, when the operating frequency Fdrv decreases, the rising period Tr has a longer duration. However, increasing the operating frequency Fdrv of the light source driving signal Sdrv might rapidly switch the internal components of the conversion module 205. Therefore, switching loss and electromagnetic interference (EMI) would occur in the conversion module 205.

Briefly, the internal components of the conversion module 205 operate based on the operating frequency Fdrv of the light source driving signal Sdrv. The higher operating frequency Fdrv the light source driving signal Sdrv has, the higher switching rate of the internal components of the conversion module 205 is subjected to. Thus, it also increases the temperature of the internal components of the light source driving module 20. The high temperature is likely to affect the switching rate, the reliability or the lifetime of the components. Therefore, the light source driving module 20 should adopt high-temperature components in this condition. Thus, the production cost of the light source driving module 20 increases. In other words, although low operating frequency Fdrv of the light source driving signal Sdrv extends the rising period Tr, it reduces the production cost. Taking advantage of high operating frequency Fdrv resulting in short rising period Tr and low operating frequency Fdrv resulting in low production cost, the present disclosure provides a circuit design that dynamically adjusts the operating frequency Fdrv of the light source driving signal Sdrv.

Figure 4:
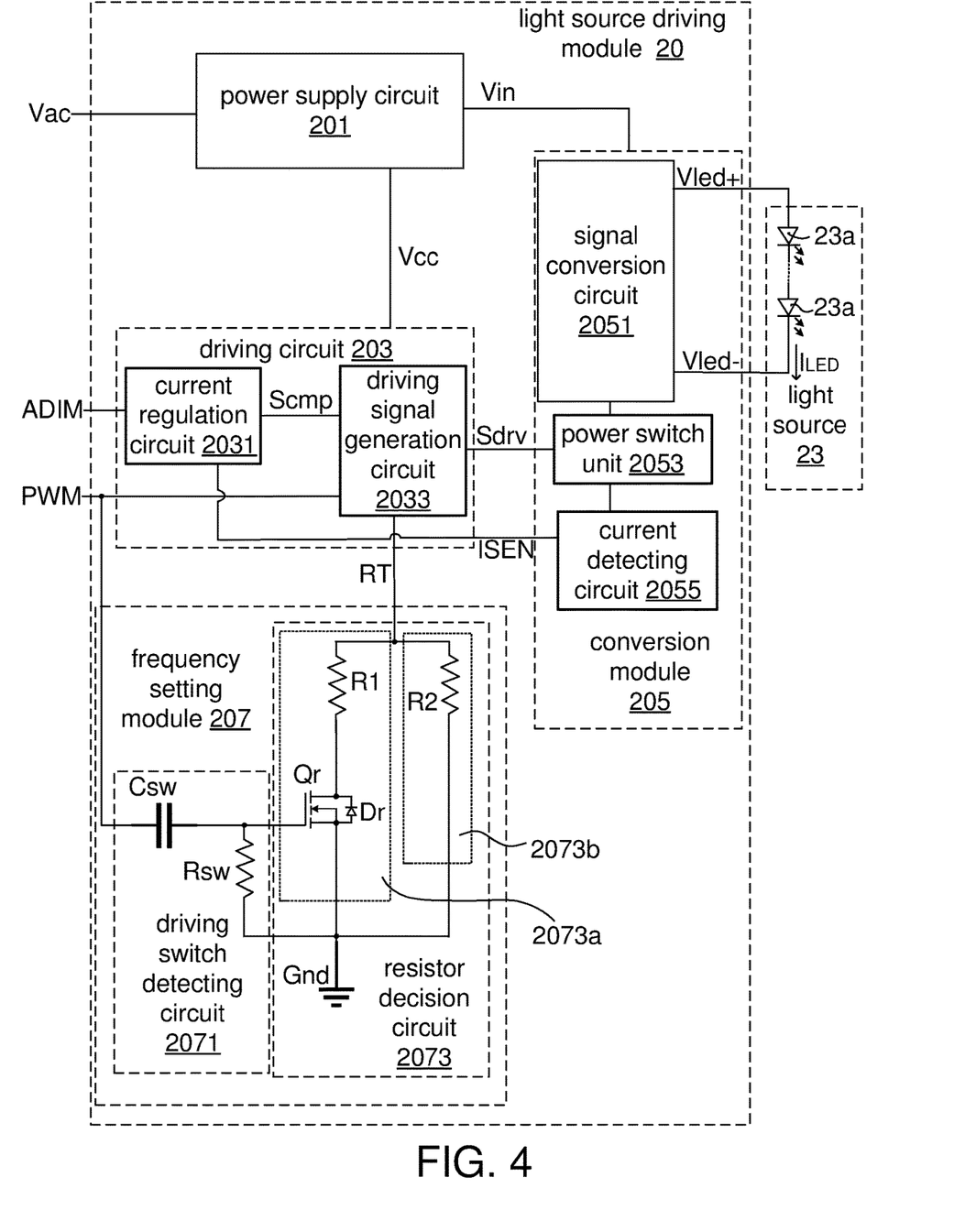
FIG. 4 is a circuit diagram of the light source driving module according to an embodiment of the present disclosure.

Please refer to FIG. 4, which is a circuit diagram of the light source driving module according to an embodiment of the present disclosure. This diagram shows the components of the circuits and their connection relations. The signals and operation of the corresponding circuits will be described with reference to FIGS. 5 and FIG. 6.

The power supply circuit 201 converts the alternating voltage Vac into the input voltage Vin and the operating voltage Vcc. Further, the power supply circuit 201 provides the operating voltage Vcc to the driving circuit 203, and provides the input voltage Vin to the conversion module 205.

The driving circuit 203 includes a current regulation circuit 2031 and a driving signal generation circuit 2033. The current regulation circuit 2031 receives the current control signal ADIM and the current feedback signal ISEN from the controller and the conversion module 205, respectively, to generate a current comparison result Scmp. The driving signal generation circuit 2033 receives the current comparison result Scmp, the switching signal PWM and the frequency setting signal RT from the current regulation circuit 2031, the controller and the frequency setting module 207, respectively, to generate the light source driving signal Sdrv. According to the concept of the present disclosure, the switching signal PWM controls the driving signal generation circuit 2033 to generate the light source driving signal Sdrv, and the current control signal ADIM sets the current value of the driving current $I_{LED}$.

Figure 5A:
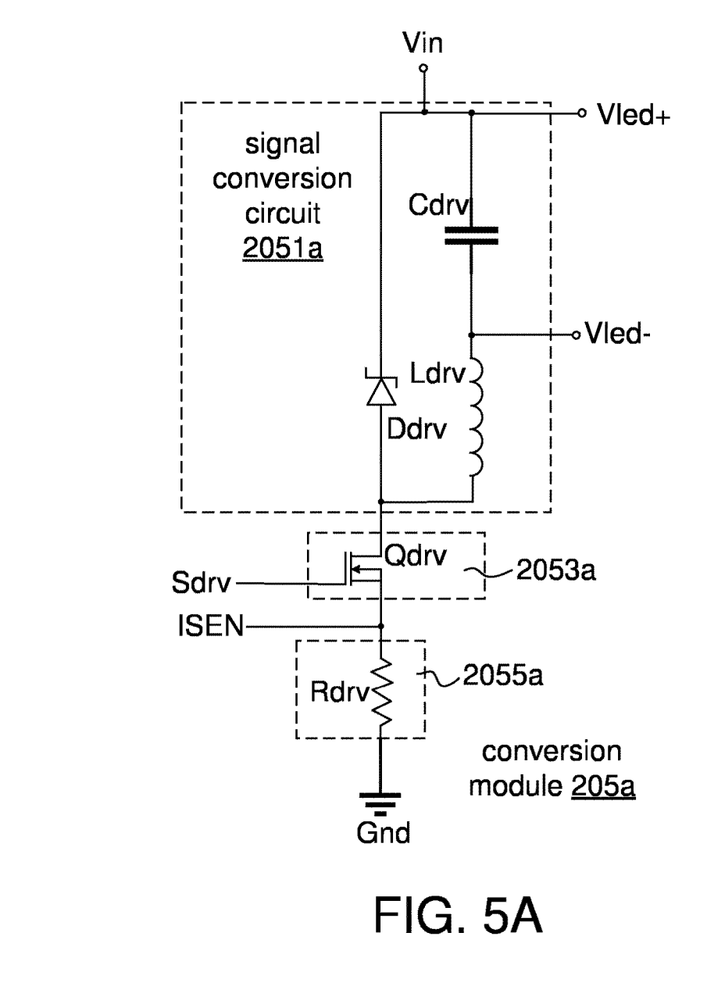
FIGS. 5A and 5B are circuit diagrams illustrating embodiments of the conversion modules.
Figure 5B:
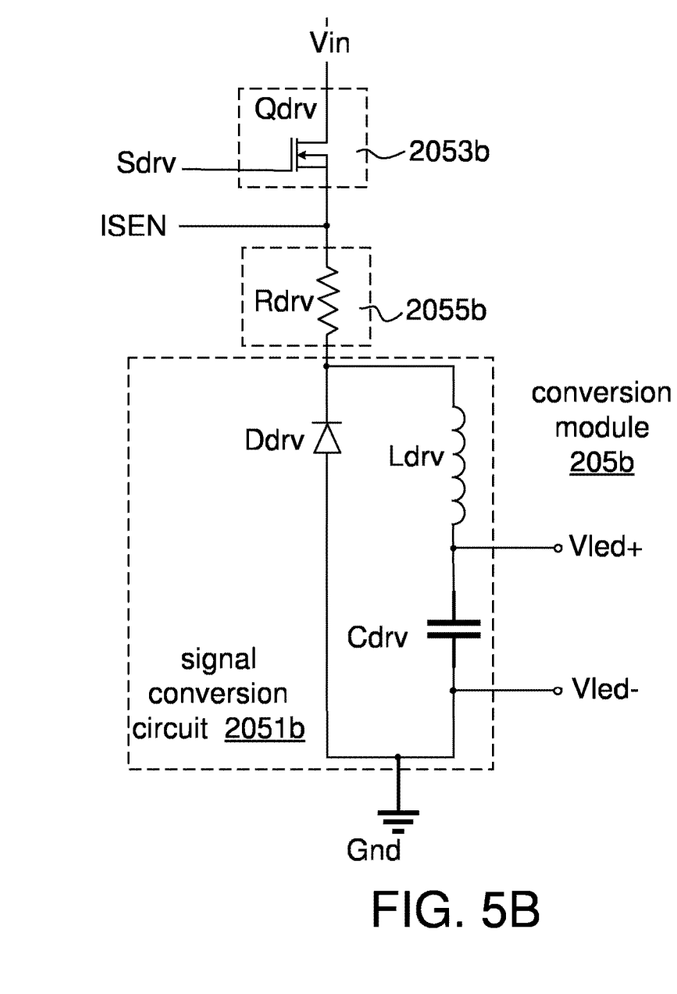

The conversion module 205 includes a signal conversion circuit 2051, a power switch unit 2053, and a current detecting circuit 2055. The signal conversion circuit 2051 could be a buck converter that supplies the light source driving voltages Vled+ and Vled− to the light source 23. The power switch unit 2053 receives the light source driving signal Sdrv from the driving signal generation circuit 2033. The current detecting circuit 2055 generates and transmits the current feedback signal ISEN to the current regulation circuit 2031. The signal conversion circuit 2051 is electrically connected to the light source 23; the power switch unit 2053 is electrically connected to the driving signal generation circuit 2033, the current detecting circuit 2055 and the signal conversion circuit 2051; and the current detecting circuit 2055 is electrically connected to the current regulation circuit 2031. In practical applications, the signal conversion circuit 2051, the power switch unit 2053, and the current detecting circuit 2055 may have modified connection and internal components. Please refer to FIGS. 5A and 5B, which are circuit diagrams illustrating embodiments of the conversion module 205. The conversion modules 205a and 205b shown in FIGS. 5A and 5B are exemplified conversion modules. In practical applications, the design of the conversion module 205 is not limited to the example.

In FIG. 5A, the conversion module 205a includes a signal conversion circuit 2051a, a power switch unit 2053a (for example, transistor Qdrv), and a current detecting circuit 2055a (for example, resistor Rdrv). The signal conversion circuit 2051a is electrically connected to the power supply circuit 201, and receives the input voltage Vin from the power supply circuit 201. The power switch unit 2053a is electrically connected to the signal conversion circuit 2051a and the current detecting circuit 2055a. The current detecting circuit 2055a is electrically connected to the ground terminal Gnd. The signal conversion circuit 2051a further includes a capacitor Cdrv, an inductor Ldrv, and a diode Ddrv. The two terminals of the capacitor Cdrv are coupled to the light source driving voltages Vled+ and Vled−, respectively. The drain terminal and the source terminal of the transistor Qdrv are electrically connected to the signal conversion circuit 2051a and the resistor Rdrv, respectively. The gate terminal of the transistor Qdrv receives the light source driving signal Sdrv.

In FIG. 5B, the conversion module 205b includes a signal conversion circuit 2051b, a power switch unit 2053b (for example, transistor Qdrv), and a current detecting circuit 2055b (for example, resistor Rdrv). The power switch unit 2053b is electrically connected to the power supply circuit 201, and receives the input voltage Vin from the power supply circuit 201. The drain terminal and the source terminal of the transistor Qdrv are electrically connected to the power supply circuit 201 and the resistor Rdrv, respectively. The gate terminal of the transistor Qdrv receives the light source driving signal Sdrv. The current detecting circuit 2055b is electrically connected to the power switch unit 2053b and the signal conversion circuit 2051b. The signal conversion circuit 2051b is electrically connected to the ground terminal Gnd. The signal conversion circuit 2051b further includes a capacitor Cdrv, an inductor Ldrv, and a diode Ddrv. The two terminals of the capacitor Cdrv are coupled to the light source driving voltages Vled+ and Vled−, respectively.

In FIGS. 5A and 5B, the resistor Rdrv generates and transmits the current feedback signal ISEN to the current regulation circuit 2031; the diode Ddrv stabilizes the voltage; and the inductor Ldrv and the capacitor Cdrv are used for energy storage. In the embodiment, the diode Ddrv could be a Zener diode, and the transistor Qdrv could be an N-type power metal-oxide-semiconductor field-effect transistor (MOSFET). In practical applications, the circuit design of the conversion module 205 is not limited to the embodiments.

In the conversion module 205, when the transistor Qdrv is switched on, the driving current $I_{LED}$ flows through the LED 23a to drive the LED 23a to emit light and charge the inductor Ldrv. When the transistor Qdrv is switched off, the inductor Ldrv, the diode Ddrv and the light source 23 form a loop. The energy stored in the inductor Ldrv enables the LED 23a of the light source 23 to keep emitting light. Therefore, even though the transistor Qdrv is switched off, the LED 23a still luminesces.

In the conversion module 205, the transistor Qdrv is switched on or off according to the bias between the source terminal and the gate terminal receiving the light source driving signal Sdrv. When the transistor Qdrv is switched on, the source terminal of the transistor Qdrv outputs the current feedback signal ISEN. As shown in FIG. 4, the current detecting circuit 2055 transmits the current feedback signal ISEN to the current regulation circuit 2031. After that, the current regulation circuit 2031 compares the current feedback signal ISEN and the current control signal ADIM and generates the current comparison result Scmp after the comparison.

If the current comparison result Scmp indicates that the current value set by the current control signal ADIM is greater than the current value of the driving current $I_{LED}$ represented by the current feedback signal ISEN, the driving signal generation circuit 2033 adjusts the light source driving signal Sdrv to raise the current value of the driving current $I_{LED}$. On the contrary, if the current comparison result Scmp indicates that the current value set by the current control signal ADIM is less than the current value of the driving current $I_{LED}$ represented by the current feedback signal ISEN, the driving signal generation circuit 2033 suspends outputting the light source driving signal Sdrv.

The frequency setting module 207 includes the driving switch detecting circuit 2071 and the resistor decision circuit 2073. The driving switch detecting circuit 2071 includes a capacitor Csw and a resistor Rsw. The resistor decision circuit 2073 includes current paths 2073a and 2073b connected in parallel. The current path 2073a includes a resistor R1, a transistor Qr, and a diode Dr. The current path 2073b includes a resistor R2. One terminal of the resistor R1 is electrically connected to the driving signal generation circuit 2033, and the other terminal of the resistor R1 is electrically connected to the drain terminal of the transistor Qr. The gate terminal of the transistor Qr is electrically connected to the capacitor Csw and the resistor Rsw, and the source terminal of the transistor Qr is electrically connected to the ground terminal Gnd. The anode terminal of the diode Dr is electrically connected to the ground terminal Gnd and the cathode terminal of the diode Dr is electrically connected to the drain terminal of the transistor Qr. One terminal of the resistor R2 is electrically connected to the driving signal generation circuit 2033, and the other terminal of the resistor R2 is electrically connected to the ground terminal Gnd.

According to the concepts of the present disclosure, the transistor Qr functions as a switch which is controlled by the driving switch detecting circuit 2071. When the transistor Qr is switched on, both the current paths 2073a and 2073b are connected. At this time, the equivalent resistance Req between the driving signal generation circuit 2033 and the ground terminal Gnd is equivalent to the resistance value of the resistors R1 and R2 in parallel (Req=R1//R2). On the other hand, when the transistor Qr is switched off, the current path 2073a is disconnected, and the current path 2073b is connected. At this time, the equivalent resistance Req between the driving signal generation circuit 2033 and the ground terminal Gnd is equivalent to the resistance value of the resistor R2 (Req=R2).

The change in the equivalent resistance Req between the driving signal generation circuit 2033 and the ground terminal Gnd results in the change to the voltage of the frequency setting signal RT. Thus, the driving signal generation circuit 2033 adjusts the operating frequency Fdrv of the light source driving signal Sdrv according to the voltage of the frequency setting signal RT.

In the embodiment below, it is set that there is a negative relationship between the operating frequency Fdrv of the light source driving signal Sdrv and the equivalent resistance Req. In other words, when the equivalent resistance Req has a greater resistance value, the light source driving signal Sdrv has a lower operating frequency Fdrv. On the other hand, when the equivalent resistance Req has a smaller resistance value, the light source driving signal Sdrv has a higher operating frequency Fdrv. As described above, when the transistor Qr is switched on, the equivalent resistance Req has a smaller resistance value (Req=R1//R2) so that the light source driving signal Sdrv has a higher operating frequency Fdrv (Fdrv=Fh). Otherwise, when the transistor Qr is switched off, the equivalent resistance Req has a greater resistance value (Req=R2) so that the light source driving signal Sdrv has a lower operating frequency Fdrv (Fdrv=Fh). Since there is a negative relationship between the operating frequency Fdrv of the light source driving signal Sdrv and the equivalent resistance Req, the light source driving module 20 of the present disclosure can change the operating frequency Fdrv of the light source driving signal Sdrv by adjusting the equivalent resistance Req between the driving signal generation circuit 2033 and the ground terminal Gnd.

Figure 6:
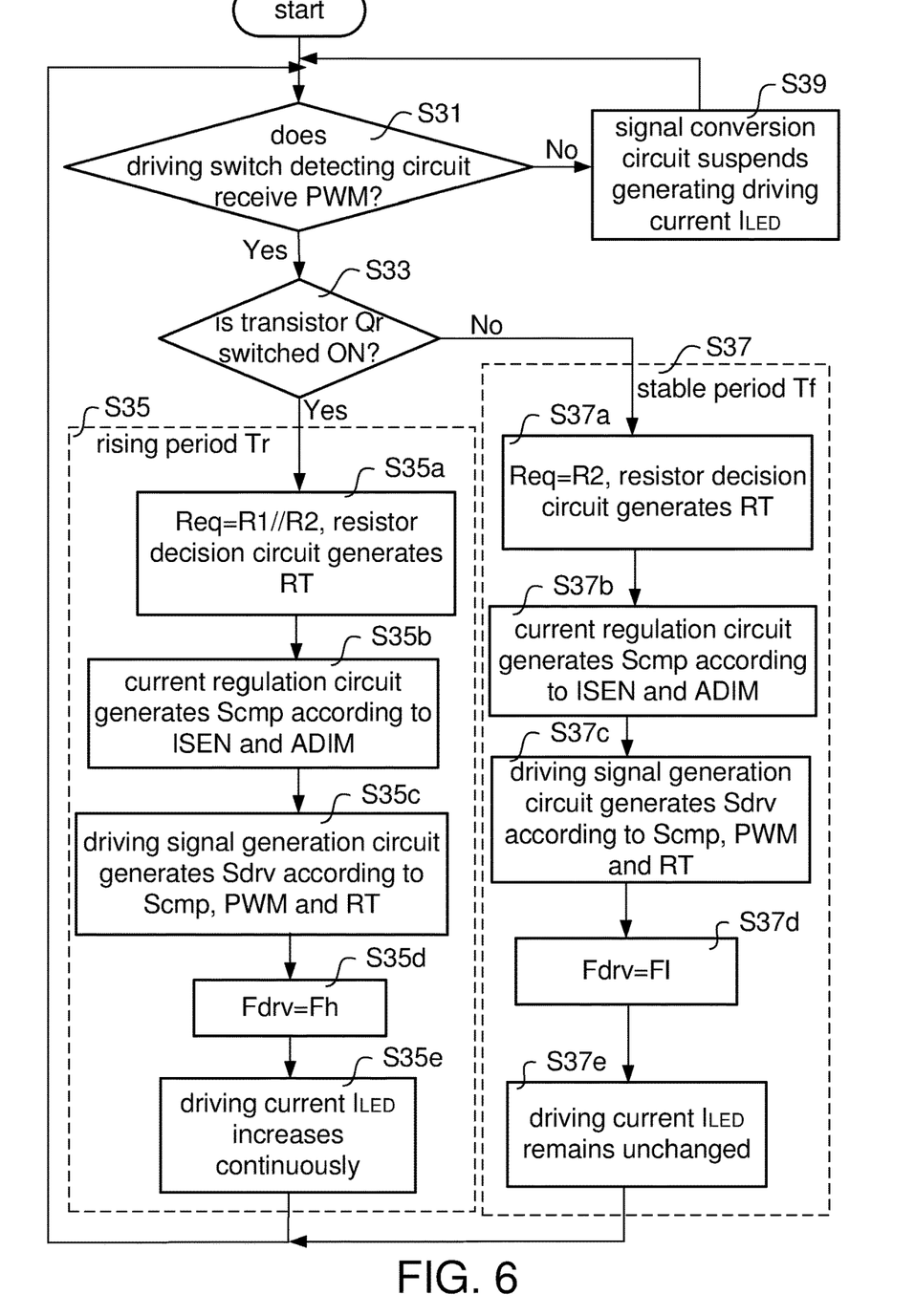
FIG. 6 is a flowchart showing that the light source driving module dynamically adjusts the operating frequency Fdrv of the light source driving signal Sdrv.

FIG. 6 is a flowchart showing that the light source driving module dynamically adjusts the operating frequency Fdrv of the light source driving signal Sdrv. At first, it is determined whether the driving switch detecting circuit 2071 receives a high-level switching signal PWM (for example, 3.3V) (step S31). If not, the driving signal generation circuit 2033 does not generate the light source driving signal Sdrv, and the conversion module 205 does not generate the driving current $I_{LED}$ (step S39). Then, the operation returns to step S31.

If it is determined yes in step S31, it is further determined whether the transistor Qr of the resistor decision circuit 2073 is switched on. If it is determined yes in step S33, the light source driving module 20 operates within the rising period Tr (step S35). If it is determined no in step S33, the light source driving module 20 operates within the stable period Tf (step S37). Details of steps S35 and S37 are described below.

Step S35 is now described with reference to FIGS. 4 and 6. In FIG. 4, the driving switch detecting circuit 2071 receives the switching signal PWM through the capacitor Csw. Immediately after the switching signal PWM is switched from a low level (for example, 0V) to a high level (for example, 3.3V), the capacitor Csw couples the voltage at the high level to the gate terminal of the transistor Qr to switch on the transistor Qr. At this time, the equivalent resistance Req is the resistance value of the resistors R1 and R2 in parallel (Req=R1//R2), and the resistor decision circuit 2073 provides the frequency setting signal RT to the driving signal generation circuit 2033 (step S35a). Further, the current regulation circuit 2031 generates the current comparison result Scmp according to the current feedback signal ISEN and the current control signal ADIM (step S35b). Afterward, the driving signal generation circuit 2033 generates the light source driving signal Sdrv according to the current comparison result Scmp, the switching signal PWM, and the frequency setting signal RT. At this time, the operating frequency Fdrv of the light source driving signal Sdrv is the high operating frequency Fh (Fdrv=Fh) (step S35d), and the current value of the driving current $I_{LED}$ increases continuously (step S35e).

Step S37 is now described with reference to FIGS. 4 and 6. In FIG. 4, the driving switch detecting circuit 2071 continues to receive the switching signal PWM through the capacitor Csw for a while. Then, the charged capacitor Csw isolates the gate terminal of the transistor Qr from the switching signal PWM so as to switch off the transistor Qr. At this time, the equivalent resistance Req is the resistance value of the resistor R2 (Req=R2), and the resistor decision circuit 2073 provides the frequency setting signal RT to the driving signal generation circuit 2033 (step S37a). Further, the current regulation circuit 2031 generates the current comparison result Scmp according to the current feedback signal ISEN and the current control signal ADIM (step S37b). Afterward, the driving signal generation circuit 2033 generates the light source driving signal Sdrv according to the current comparison result Scmp, the switching signal PWM and the frequency setting signal RT. At this time, the operating frequency Fdrv of the light source driving signal Sdrv is the low operating frequency Fl (Fdrv=Fl) (step S37d), and the current value of the driving current $I_{LED}$ remains unchanged or constant (step S35e).

As shown in FIG. 6, the light source driving module 20 has two behaviors, and the data are collected in Table 1.

TABLE 1

| Status of transistor Qr | ON | OFF |
|---|---|---|
| Corresponding step | S35 | S37 |
| Equivalent resistance Req between driving signal generation circuit and ground terminal Gnd | R1//R2 (smaller) | R2 (greater) |

TABLE 1-continued

| Status of transistor Qr | ON | OFF |
|---|---|---|
| operating frequency Fdrv of light source driving signal Sdrv | Fdrv = Fh | Fdrv = Fl |
| Period or driving current $I_{LED}$ | Rising period Tr | Stable period Tf |
| Behavior of driving current $I_{LED}$ | Going up | Constant |

Figure 7:
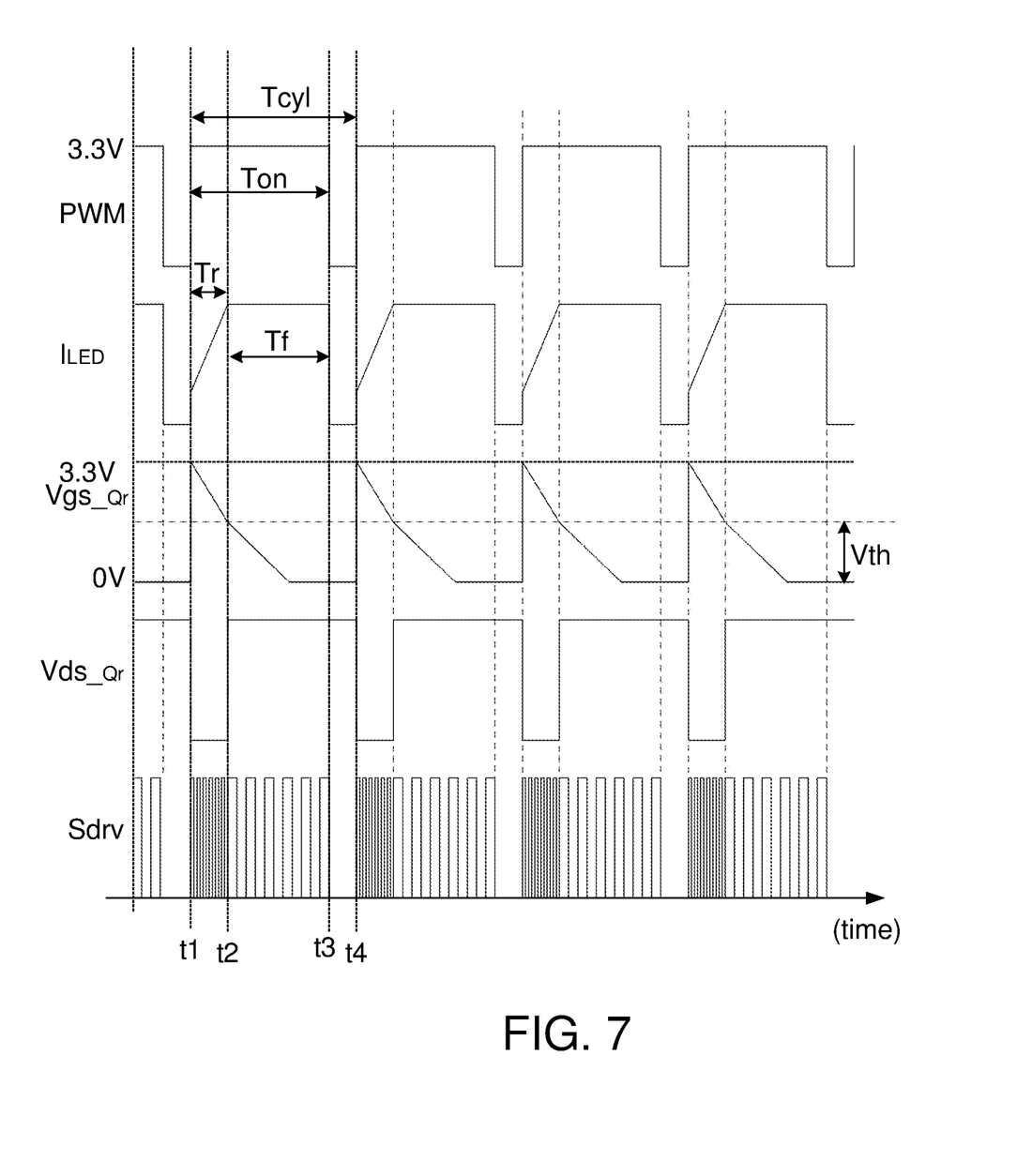
FIG. 7 is a waveform diagram showing that the light source driving module dynamically adjusts the operating frequency Fdrv of the light source driving signal Sdrv to shorten the rising period of the driving current $I_{LED}$.

Please refer to FIG. 7, which is a waveform diagram showing that the light source driving module dynamically adjusts the operating frequency Fdrv of the light source driving signal Sdrv to shorten the rising period of the driving current $I_{LED}$. Please refer to FIGS. 4, 6, and 7 together.

In FIG. 7, the x-axis represents time. One cycle Tcyl of the switching signal PWM starts at the time point t1 and ends at the time point t4. In the cycle Tcyl, the switching signal PWM has a high-level period Ton from the time point t1 to the time point t3. The period from the time point t1 to the time point t2 is the rising period Tr of the driving current $I_{LED}$. The light source driving module 20 operates within this period corresponding to step S35 in FIG. 6. The period from the time point t2 to the time point t3 is the stable period Tf of the driving current $I_{LED}$. The light source driving module 20 operates within this period corresponding to the step S37 in FIG. 6.

In FIG. 7, the waveform plots of the switching signal PWM, the driving current $I_{LED}$, the gate-source voltage $Vgs_{-Qr}$ of the transistor Qr, the drain-source voltage $Vds_{-Qr}$ of the transistor Qr, and the light source driving signal Sdrv are shown from top to bottom.

During the rising period Tr between the time points t1 and t2, the gate terminal of the transistor Qr receives the switching signal PWM through the capacitor Csw, and the source terminal of the transistor Qr is coupled to the ground voltage Gnd. The gate-source voltage $Vgs_{-Qr}$ of the transistor Qr is greater than the threshold voltage Vth of the transistor Qr during the period between the time points t1 and t2, so that the transistor Qr is switched on. At this time, since the transistor Qr is switched on during the period between the time points t1 and t2, the drain-source voltage $Vds_{-Qr}$ of the transistor Qr is 0V. As described with reference to FIG. 6, when the transistor Qr is switched on, the equivalent resistance Req of the resistor decision circuit 2073 is equivalent to the resistance value of the resistors R1 and R2 in parallel (Req=R1//R2), and the resistor decision circuit 2073 sends the frequency setting signal RT to the driving signal generation circuit 2033. The driving signal generation circuit 2033 generates the light source driving signal Sdrv in response to the switching signal PWM and the frequency setting signal RT. At this time, the operating frequency Fdrv of the light source driving signal Sdrv has a higher frequency, and the current value of the driving current $I_{LED}$ increases continuously.

During the stable period Tf between the time points t2 and t3, the voltage at the gate terminal of the transistor Qr gradually decreases, for example, to 0V. Because the gate-source voltage $Vgs_{-Qr}$ of the transistor Qr is less than the threshold voltage Vth of the transistor Qr, the gate-source voltage $Vgs_{-Qr}$ is not high enough to keeps the transistor Qr on. The drain-source voltage $Vds_{-Qr}$ of the switched-off transistor Qr is at a high level. As shown in FIG. 6, when the transistor Qr is switched off, the equivalent resistance Req of the resistor decision circuit 2073 is equivalent to the resistance value of the resistor R2 (Req=R2), and the resistor decision circuit 2073 sends the frequency setting signal RT to the driving signal generation circuit 2033. The driving signal generation circuit 2033 generates the light source driving signal Sdrv in response to the switching signal PWM and the frequency setting signal RT. At this time, the operating frequency Fdrv of the light source driving signal Sdrv has a lower frequency Fl, and the current value of the driving current $I_{LED}$ remains unchanged or constant.

In FIG. 7, the amplitude of the light source driving signal Sdrv is similar within the rising period Tr and the stable period Tf, but the frequency of the light source driving signal Sdrv within the rising period Tr is different from that within the stable period Tf. Comparing the light source driving signal Sdrv within the rising period Tr between the time points t1 and t2 and that within the stable period Tf between the time points t2 and t3, the operating frequency Fdrv of the light source driving signal Sdrv within the rising period Tr has a higher frequency (Fdrv=Fh), while the operating frequency Fdrv of the light source driving signal Sdrv within the stable period Tf has a lower frequency (Fdrv=Fl).

As described above, the longer rising period Tr corresponds to the gate-source voltage $Vgs_{-Qr}$ of the transistor Qr with a gentler slope. On the contrary, the shorter rising period Tr corresponds to the gate-source voltage $Vgs_{-Qr}$ of the transistor Qr with a steeper slope. According to the concepts of the present disclosure, the driving switch detecting circuit 2071 can decide the charging speed by selecting the capacitor Csw having a proper capacitance value and the resistor Rsw having a proper resistance value. In other words, the duration of the rising period Tr is determined according to the capacitance value of the capacitor Csw and the resistance value of the resistor Rsw.

It is to be noted that the high operating frequency Fh and the low operating frequency Fl could be selected according to the purpose and the specification of the light source device. For example, the high operating frequency Fh is selected as 300 KHz, and the low operating frequency Fl is selected as 100 KHz. After the high operating frequency Fh and the low operating frequency Fl are determined, the resistor decision circuit 2073 can decide the resistance values of the resistors R1 and R2.

In step S39 of FIG. 6, the switching signal PWM is at a low level during the period between the time points t3 and t4. At this time, the driving circuit 203 suspends generating the light source driving signal Sdrv and the LED 23a is driven by the energy stored in the inductor Ldrv instead. Going to the time point t4, The switching signal PWM starts another cycle Tcyl.

The light source driving module and the light source driving method according to the present disclosure use different resistance values to control the operating frequency Fdrv of the light source driving signal Sdrv during the rising period Tr and the stable period Tf. During the rising period Tr, the equivalent resistance Req has a smaller resistance value to set the operating frequency Fdrv of the light source driving signal Sdrv to the high operating frequency Fh. On the other hand, during the stable period Tf, the equivalent resistance Req has a greater resistance value to set the operating frequency Fdrv of the light source driving signal Sdrv to the low operating frequency Fl. Therefore, the light source driving signal Sdrv at the high operating frequency Fh can shorten the duration of the rising period Tr, and the light source driving signal Sdrv at the low operating frequency Fl during the stable period Tf can prevent from switching loss and electromagnetic interference resulting from rapid switching the components.

It is to be noted that although there is a negative relationship between the operating frequency Fdrv of the light source driving signal Sdrv and the equivalent resistance Req in the above embodiments, the relationship could be modified in different applications. For example, there could be a positive relationship between the operating frequency Fdrv of the light source driving signal Sdrv and the equivalent resistance Req. In this case, the resistor decision circuit 2073 has an equivalent resistance Req with a greater resistance value during the rising period Tr to increase the operating frequency Fdrv of the light source driving signal Sdrv. On the other hand, the resistor decision circuit 2073 has an equivalent resistance Req with a smaller resistance value during the stable period Tf to decrease the operating frequency Fdrv of the light source driving signal Sdrv. The related modification and design are not particularly described herein.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light source driving module electrically connected to a light source and a controller, comprising:
   a frequency setting module, configured for generating a frequency setting signal according to a switching signal from the controller;
   a driving circuit, electrically connected to the frequency setting module and configured for generating a light source driving signal after receiving the switching signal and a current control signal from the controller; and
   a conversion module, electrically connected to the driving circuit and the light source and configured for selectively generating a driving current flowing through the light source in response to the light source driving signal, wherein
   the driving current increases continuously during a rising period, and the light source driving signal has a first operating frequency during the rising period, and
   the driving current remains unchanged during a stable period, and the light source driving signal has a second operating frequency during the stable period.

2. The light source driving module according to claim 1, wherein the first operating frequency is different from the second operating frequency.

3. The light source driving module according to claim 2, wherein the first operating frequency is higher than the second operating frequency.

4. The light source driving module according to claim 1, wherein the frequency setting module comprises:
   a driving switch detecting circuit, configured for receiving the switching signal; and
   a resistor decision circuit, comprising:
   a first current path, electrically connected to the driving switch detecting circuit, the driving circuit and a ground terminal, configured for being selectively connected in response to the switching signal; and
   a second current path, electrically connected to the driving circuit and the ground terminal, configured for remaining connected.

5. The light source driving module according to claim 4, wherein the driving switch detecting circuit comprises:
   a capacitor, electrically connected to the first current path, configured for receiving the switching signal; and
   a first resistor, electrically connected to the capacitor, the first current path, and the ground terminal.

6. The light source driving module according to claim 5, wherein the first current path comprises:
   a second resistor; and
   a first transistor, electrically connected to the capacitor, the first resistor, the second resistor, and the ground terminal, wherein the first transistor is selectively switched on according to the switching signal.

7. The light source driving module according to claim 4, wherein the first current path is connected during the rising period, and is disconnected during the stable period.

8. The light source driving module according to claim 4, wherein the stable period follows the rising period, and the rising period is shorter than the stable period.

9. The light source driving module according to claim 1, wherein the light source driving module is electrically connected to the controller, and the light source driving module receives the switching signal and the current control signal associated with the light source from the controller.

10. The light source driving module according to claim 1, wherein each cycle of the switching signal has a duration longer than an overall duration of the rising period and the stable period.

11. The light source driving module according to claim 10, wherein the switching signal is at a high level during the rising period and the stable period.

12. A light source driving method used with a light source driving module electrically connected to a light source and a controller, wherein the light source driving method comprises steps of:
   receiving a switching signal and a current control signal from the controller;
   generating a frequency setting signal, via a frequency setting module, according to the switching signal from the controller;
   generating a light source driving signal, via a driving circuit, according to the switching signal and the current control signal from the controller; and
   selectively generating a driving current flowing through the light source, via a conversion module, in response to the light source driving signal, wherein
   the driving current increases continuously during a rising period, and the light source driving signal has a first operating frequency during the rising period, and
   the driving current remains unchanged during a stable period, and the light source driving signal has a second operating frequency during the stable period.

13. The light source driving method according to claim 12, wherein the first operating frequency is different from the second operating frequency.

14. The light source driving method according to claim 13, wherein the first operating frequency is higher than the second operating frequency.

15. The light source driving method according to claim 12, wherein the step of generating the frequency setting signal according to the switching signal comprises steps of:
   receiving the switching signal;
   selectively connecting a first current path in response to the switching signal; and
   remaining connecting a second current path.

16. The light source driving method according to claim 15, wherein the first current path is connected during the rising period, and is disconnected during the stable period.

17. The light source driving method according to claim 15, wherein the stable period follows the rising period, and the rising period is shorter than the stable period.

18. The light source driving method according to claim 12, wherein the switching signal and the current control signal are associated with the light source.

19. The light source driving method according to claim 12, wherein each cycle of the switching signal has a duration longer than an overall duration of the rising period and the stable period.

20. The light source driving method according to claim 19, wherein the switching signal is at a high level during the rising period and the stable period.

* * * * *